(12) United States Patent
Cunningham

(10) Patent No.: US 7,438,109 B2
(45) Date of Patent: Oct. 21, 2008

(54) TIRE CHANGER

(75) Inventor: Charles L. Cunningham, Nashville, TN (US)

(73) Assignee: Hennessy Industries, Inc., LaVergne, TN (US)

(*) Notice: Subject to any disclaimer, the term of this patent is extended or adjusted under 35 U.S.C. 154(b) by 35 days.

(21) Appl. No.: 11/647,527

(22) Filed: Dec. 28, 2006

(65) Prior Publication Data

US 2007/0158033 A1 Jul. 12, 2007

Related U.S. Application Data

(60) Provisional application No. 60/755,660, filed on Dec. 30, 2005.

(51) Int. Cl.
*B60C 25/135* (2006.01)

(52) U.S. Cl. .................................................... 157/1.24

(58) Field of Classification Search ................ 157/1.24, 157/1.17, 1.2, 1.21
See application file for complete search history.

(56) References Cited

U.S. PATENT DOCUMENTS

| | | | |
|---|---|---|---|
| 4,209,053 A | 6/1980 | du Quesne | |
| 4,245,686 A | 1/1981 | Holladay | |
| D269,879 S | 7/1983 | Holladay et al. | |
| 4,417,614 A | 11/1983 | Cunningham et al. | |
| D293,916 S | 1/1988 | Cunningham et al. | |
| 4,960,034 A | 10/1990 | Corghi | |
| 5,219,012 A | 6/1993 | Corghi | |
| 5,244,029 A | 9/1993 | Schoen et al. | |
| 5,458,177 A | 10/1995 | Magnani | |
| 5,490,552 A | 2/1996 | Vignoli | |
| 5,623,981 A | 4/1997 | Cunningham et al. | |
| 5,669,429 A | 9/1997 | Gonzaga | |
| 5,752,555 A | 5/1998 | Cunningham et al. | |
| 5,836,368 A * | 11/1998 | Corghi ..................... 157/1.24 | |
| 5,941,294 A | 8/1999 | Cunningham et al. | |
| 6,056,034 A | 5/2000 | Matnick | |
| 6,109,327 A | 8/2000 | Gonzaga | |
| 6,173,751 B1 | 1/2001 | Magnani | |
| 6,182,736 B1 | 2/2001 | Cunningham et al. | |
| 6,192,959 B1 | 2/2001 | Spaggiari | |
| 6,227,277 B1 | 5/2001 | Corghi | |
| 6,257,299 B1 | 7/2001 | Toriselli | |
| 6,276,422 B1 | 8/2001 | Rino | |
| 6,408,921 B1 | 6/2002 | Bonacini | |
| 6,422,285 B1 | 7/2002 | Gonzaga | |
| 6,443,206 B1 * | 9/2002 | Bonacini ................... 157/1.24 | |
| 6,527,032 B2 | 3/2003 | Corghi | |
| 6,588,478 B2 | 7/2003 | Vignoli | |

(Continued)

OTHER PUBLICATIONS

Pending U.S. application entitled "Tire Changing Machine," U.S. Appl. No. 11/646,168, filed Dec. 27, 2006.

*Primary Examiner*—Jacob K. Ackun, Jr.
(74) *Attorney, Agent, or Firm*—Nelson Mullins Riley & Scarborough LLP

(57) ABSTRACT

A tire changing machine comprises a chassis and a rotatable turntable configured to retain a wheel rim. The machine further includes a tower carrying a mount/demount head movable toward and away from the wheel rim. A saddle for retaining a tire in a generally upright configuration is also provided. In addition, the machines includes an ovalation mechanism operative to press on a tread portion of a tire mounted in the saddle so as to ovalate the tire.

25 Claims, 13 Drawing Sheets

U.S. PATENT DOCUMENTS

| | | |
|---|---|---|
| 6,761,061 B2 | 7/2004 | Corghi |
| 2002/0154983 A1 | 10/2002 | Corghi |
| 2002/0164238 A1 | 11/2002 | Ferrari et al. |
| 2003/0084977 A1 | 5/2003 | Gonzaga |
| 2003/0131947 A1 | 7/2003 | Magnani |
| 2003/0150565 A1 | 8/2003 | Gonzaga |
| 2003/0217816 A1 | 11/2003 | Gonzaga |
| 2003/0221791 A1 | 12/2003 | Gonzaga |
| 2004/0055712 A1 | 3/2004 | Corghi |
| 2004/0182520 A1 | 9/2004 | Spaggiari |
| 2004/0221964 A1 | 11/2004 | Bonacini |

* cited by examiner

TIRE CHANGER

PRIORITY CLAIM

This application claims the benefit of provisional application Ser. No. 60/755,660, filed Dec. 30, 2005, which is relied upon and incorporated herein by reference.

BACKGROUND OF THE INVENTION

The present invention relates to tire changers and processes used in the changing of tires. More particularly, the present invention relates to a tire changing machine incorporating features to assist an operator in changing a tire with a liner such as those used in NASCAR vehicles.

Those of skill in the art of designing and manufacturing equipment used to change tires mounted on the rims of cars, light trucks, and other vehicles will appreciate that many prior art tire changing machines exist. For example, a rim holding tire changer is disclosed in U.S. Pat. No. 6,182,736 to Cunningham et al., the disclosure of which is incorporated herein by reference.

The typical tire-changing procedure involves the following steps: (1) loosening the seal between the tire's bead and the rim, (2) placing the tire-rim assembly on the tire changer, (3) securing the rim to the tire changer, (4) removing the tire from the rim using a mount/dismount head, (5) placing a new tire over the rim, (6) mounting the tire on the rim by using the mount/dismount head to force the bead over the rim, and (7) filling the air chamber of the tire with air to inflate the new tire.

Changing a NASCAR-specific tire involves more steps than changing a typical passenger vehicle tire due to the presence of a tire liner within the tire. Therefore, in addition to the steps recited above, changing a NASCAR tire includes steps associated with removing and installing the tire liner. Typically, the NASCAR tire is ovalated (i.e., made oval shaped) by the application of force to the tire such that the liner may be more easily removed/inserted. Because the sidewalls of NASCAR tires are typically quite stiff, the application of a relatively large amount of force may be necessary to ovalate the tire.

SUMMARY OF THE INVENTION

The present invention recognizes and addresses various considerations of prior art constructions and methods.

According to one aspect, the present invention provides a tire changing machine comprising a chassis and a rotatable turntable configured to retain a wheel rim. The machine further includes a tower carrying a mount/demount head movable toward and away from the wheel rim. A saddle for retaining a tire in a generally upright configuration is also provided. In addition, the machines includes an ovalation mechanism operative to press on a tread portion of a tire mounted in the saddle so as to ovalate the tire.

Preferably, the ovalation mechanism may include a helper arm assembly having an articulated helper arm. In such embodiments, a fluid actuated cylinder may be located at a distal end of the articulated helper arm. A contact block may be located at a distal end of the cylinder's piston shaft. An arcuate tire bar may be connected to the contact block.

In some cases, it may be desirable to provide wheels located adjacent a back of the chassis to facilitate movement of the tire changing machine. The saddle in such embodiments may be attached to the chassis at a front thereof to be used as a handle in lifting the front of the chassis. In addition, the saddle may be reversible between a tire holding and a handle position. The saddle may also define a notch for receipt of a tip portion of a pry bar to provide a fulcrum for removal of a tire liner.

According to another aspect, the present invention may provide a tire changing machine comprising a chassis and a rotatable turntable configured a retain a wheel rim. The machine further comprises a tower carrying a mount/demount head movable toward and away from the wheel rim. A horizontal roller assembly having at least one roller mounted at the distal end of an elongate bar is also provided. The elongate bar is slidable in a horizontal receiver which is vertically movable. In some exemplary embodiments, a rotational axis of the roller may be laterally offset from an axis of the elongate bar.

Other aspects of the present invention are provided by a tire changing machine comprising a chassis and a rotatable turntable configured a retain a wheel rim. The machine further includes a tower carrying a mount/demount head movable toward and away from the wheel rim. Also provided are first and second separate gas supplies with respective first and second inflation hoses permitting simultaneous inflation of a tire and an inner liner thereof. Preferably, the first and second separate gas supplies may function to supply different gases. In such embodiments, one of the gases may be air.

Other objects, features and aspects of the present invention are discussed in greater detail below.

BRIEF DESCRIPTION OF THE DRAWINGS

The accompanying drawings, incorporated in and constituting part of this specification, illustrate one or more embodiments of the invention and, together with the description, serve to explain the principles of the invention.

Figure 1:
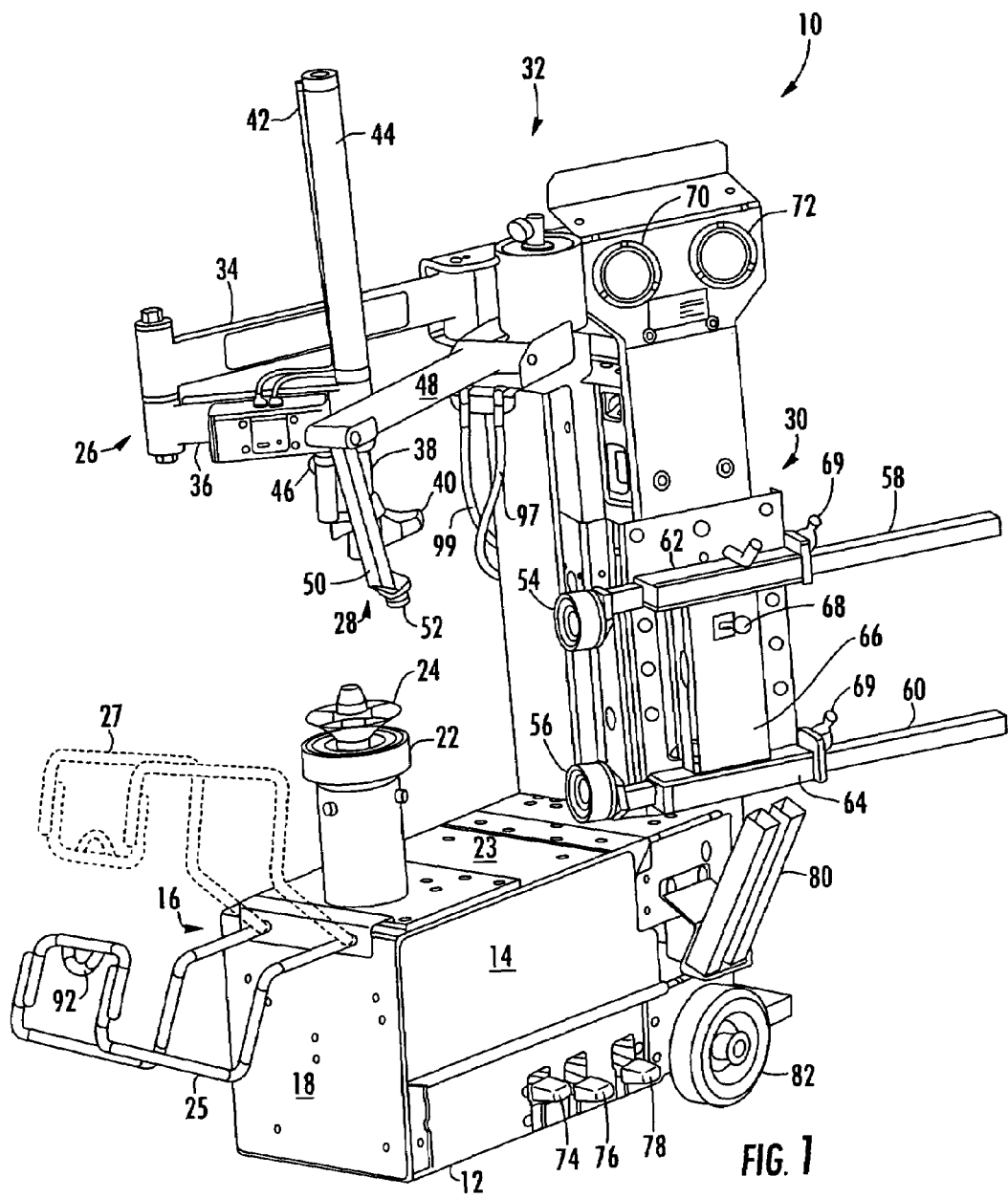
FIG. 1 is a perspective view of a tire changing machine in accordance with an embodiment of the present invention.
Figure 2:
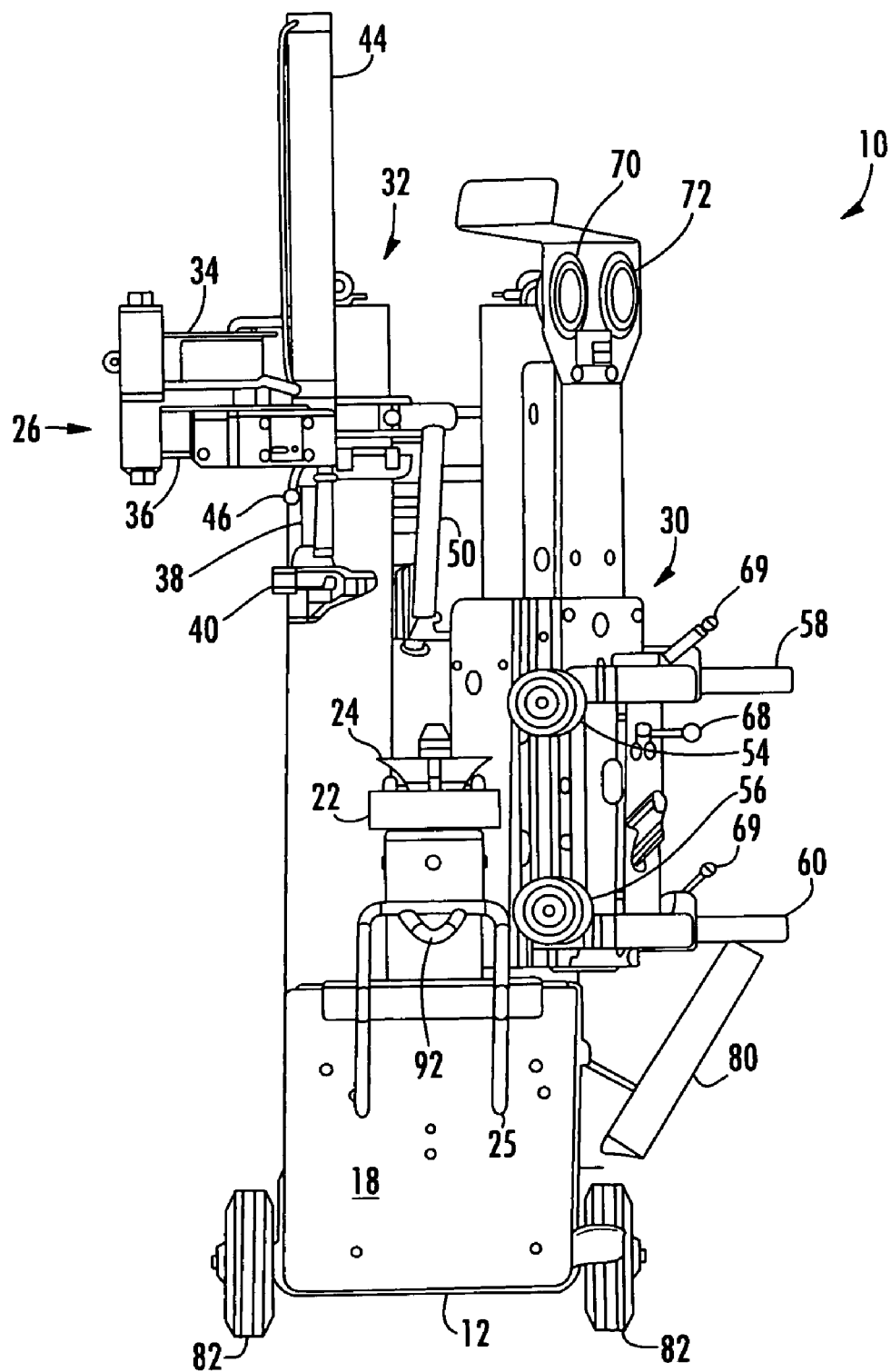
FIG. 2 is a front view of the tire changing machine of FIG. 1.
Figure 3:
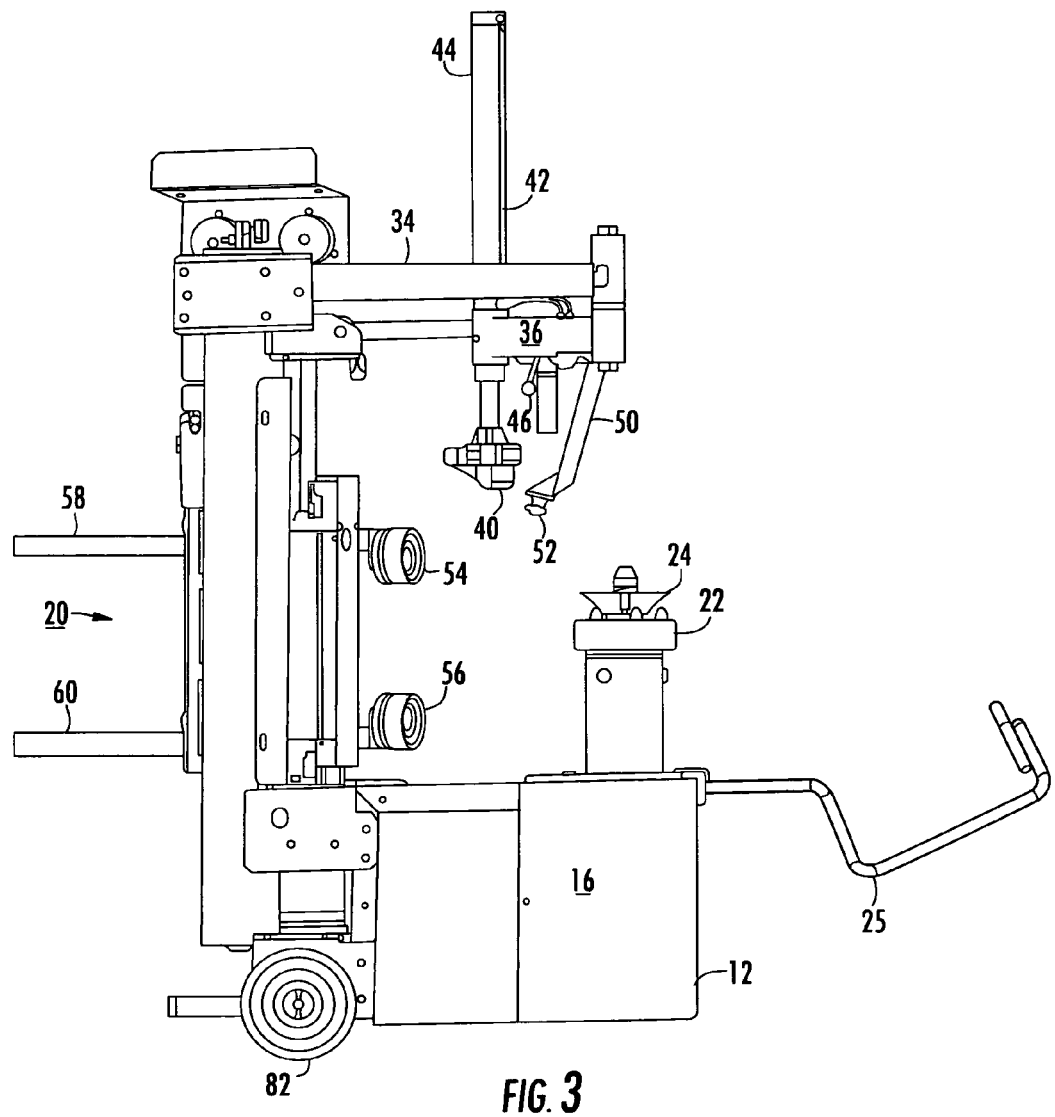
FIG. 3 is a side view of the tire changing machine of FIG. 1.
Figure 4:
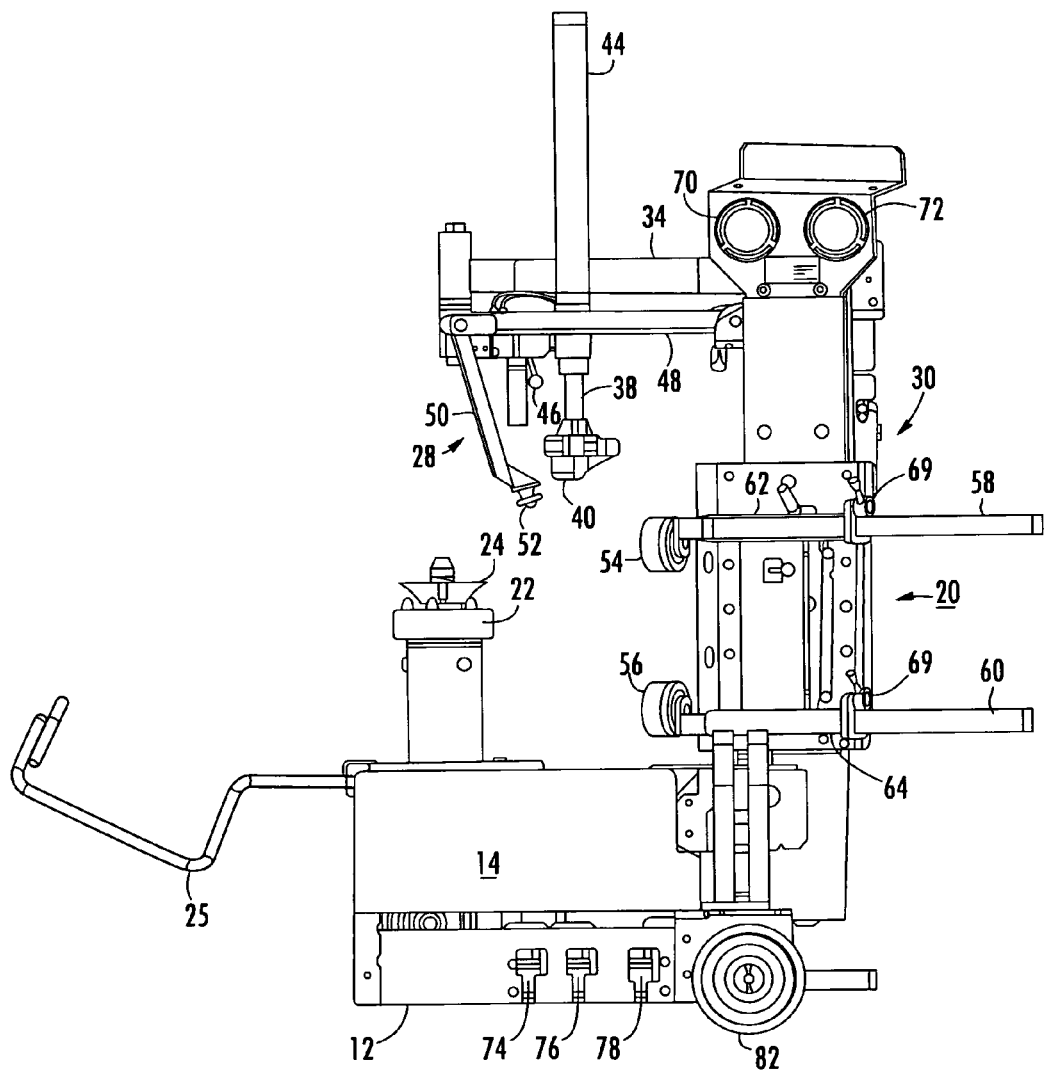
FIG. 4 is an operator side view (opposite the side of FIG. 3) of the tire changing machine in FIG. 1.
Figure 5:
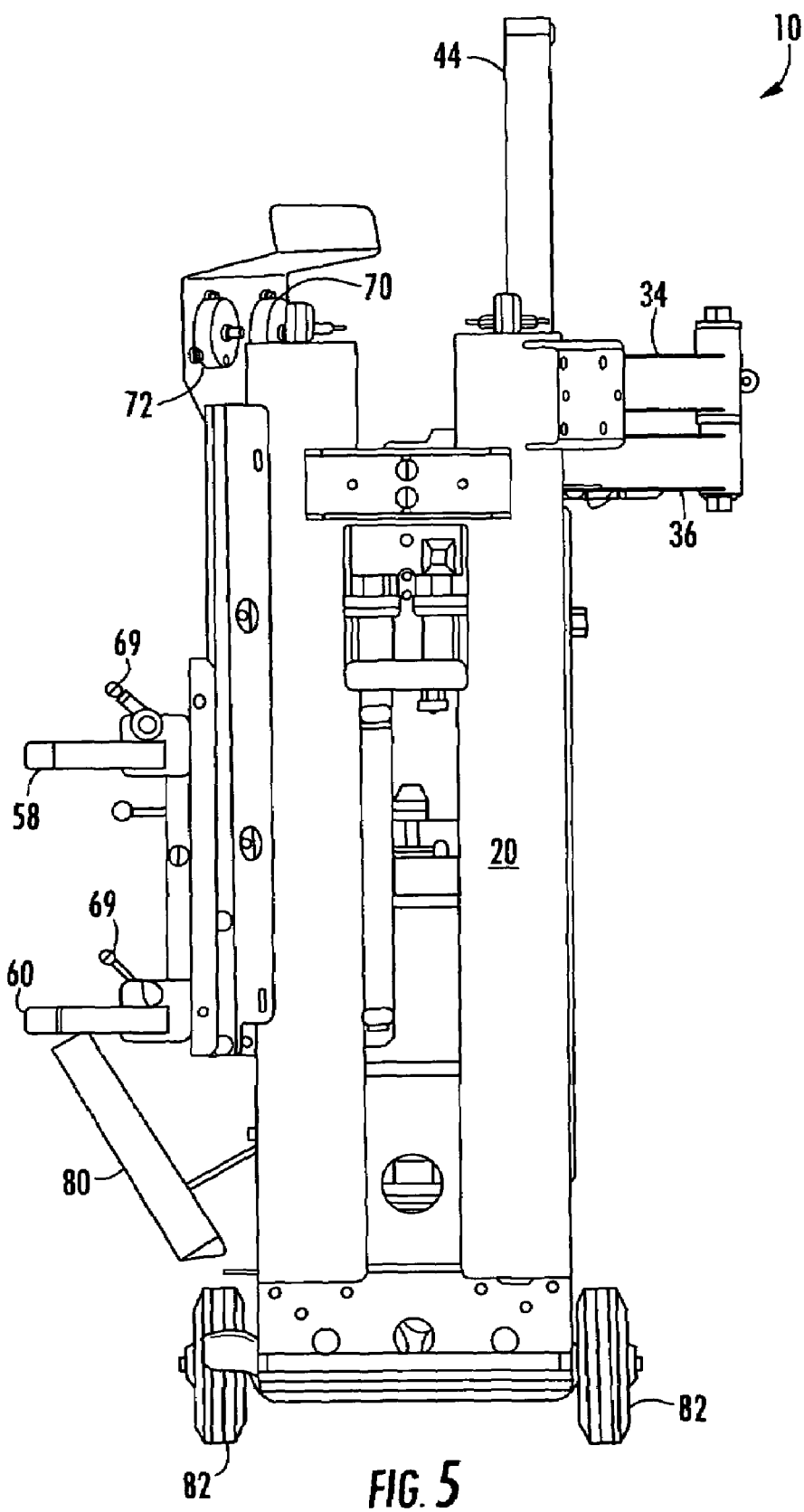
FIG. 5 is a rear view of the tire changing machine in FIG. 1.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations.

Referring first to FIGS. 1 through 5, several views of a tire changer 10 in accordance with the present invention are shown. Although tire changer 10 is designed for NASCAR-type tires, it also may assist operators in changing any type of tire, especially tires that require tire liners. As such, tire changer 10 could be used to change PAX style tires, which have a liner in the form of an annular support member.

Tire changer 10 includes a chassis 12 having a first side 14, a second side 16, a front 18, and a back 20. In this embodiment, a turntable in the form of a chuck 22 extends through a chassis top 23 and is threaded to accept a centering cone 24 to attach a rim to the chuck. One skilled in the art will appreciate, however, that other types of turntables may be used depending on the needs of a particular application. For example, embodiments are contemplated using a tabletop having rim engaging clamps that move radially.

A removable saddle 25 includes two prongs that are received in two matching holes in front 18. An additional pin (not shown) may be used to further secure saddle 25 to chassis 12. Saddle 25 is shaped and positioned to hold a NASCAR-type tire in this embodiment. Optionally, saddle 25 may be removed from the holes in front 18, rotated around and inserted into additional holes in chassis top 23. In this second configuration (shown in phantom lines in FIG. 1), saddle 25 may be used as a handle 27 by which an operator might lift the front of tire changer 10 and move it from from location to location (or to reduce the envelope size for storing while transporting the machine from one racetrack to another).

Also attached to chassis 12 are a series of implements including helper arm assembly 26, mount/dismount assembly 28, and horizontal roller system 30. A detailed description of the use of a helper arm similar to that of assembly 26 can be found in U.S. Pat. No. 6,182,736, incorporated herein by reference.

In the embodiment shown in the Figures, helper arm assembly 26 is attached to a central tower 32. The helper arm of assembly 26 has first and second arm segments 34 and 36 pivotally connected at an intermediate location for articulation with respect to one another. A proximal end of arm segment 34 is pivotally connected to tower 32. The distal end of arm segment 36 carries a fluid actuated cylinder 44 (in this case a pneumatic cylinder) having a piston shaft 38. A contact block 40 is affixed to the end of cylinder shaft 38. An air line 42 supplies air to cylinder 44, the supply of which is controlled by lever 46. Contact block 40 thus moves up and down with vertical movement of shaft 38.

Mount/dismount assembly 28 is a "floating" system in the preferred embodiment, although other types of arms known by those in the art could be utilized. Mount/dismount assembly 28 includes arm 48 hinged to central tower 32 and arm 50 hinged to arm 48. As can be seen, arms 48 and 50 are hinged to rotate in the vertical plane. A mount/dismount head 52 is provided at the distal end of arm 50.

Horizontal roller system 30 includes an upper offset roller 54 and a lower offset roller 56. Rollers 54 and 56 are attached to the end of elongate bars 58 and 60, respectively. Receivers 62 and 64, attached to a vertically movable body 66, slidably receive the respective bars. Toggling lever 68 causes body 66 (and the rollers attached thereto) to up and down (preferably by power of a pneumatic cylinder). Cam locks 69 affixed to the receivers enable the user to lock shafts 58 and 60 in a desired axial position.

In addition to mechanically assisting a user in mounting and dismounting a tire and tire liner, machine 10 also may accommodate dual gas supplies such that the user may inflate the tire and the tire liner simultaneously and/or with different gasses. At the top of tower 32 are twin inflation gauges 70 and 72, one for each of the gas supplies. Preferably, one of the dual gas supplies is attached to an accumulator that feeds both the pneumatics and one of the inflation hoses, while the other gas supply is attached to an accumulator that feeds only a second inflation hose. The inflation hoses may be conveniently mounted to tower 32, or situated at another suitable location.

At the bottom of chassis 12, a first pedal 74, a second pedal 76, and a third pedal 78 are provided. A can be seen, the pedals are located on a first side 14 of chassis 12 in the illustrated embodiment. This placement is ergonomic because it advantageously allows the operator to stand in one place while manipulating the various implements of the machine.

First pedal 74 and second pedal 76 control the flow of gas through the respective inflation hoses. That is, depressing either of the pedals will allow the passage of gas, releasing the pedals will stop the flow of gas, and pulling up on the pedals will allow gas to escape from the tire or tire liner.

Pedal 78 controls the rotation of chuck 22. Pressing down on pedal 78 rotates chuck 22 clockwise, pulling up on pedal 78 rotates the chuck counterclockwise, and removing one's foot from the pedal will cause the chuck to cease moving.

A tool holder 80 may be provided as a convenient place to store an elongate lift tool used during tire and liner mounting/dismounting. Wheels 82 are preferably provided to enable a user to more easily move machine 10. In this regard, the front of the machine may be lifted by grasping saddle 25 so that the machine can be rolled.

Figure 7:
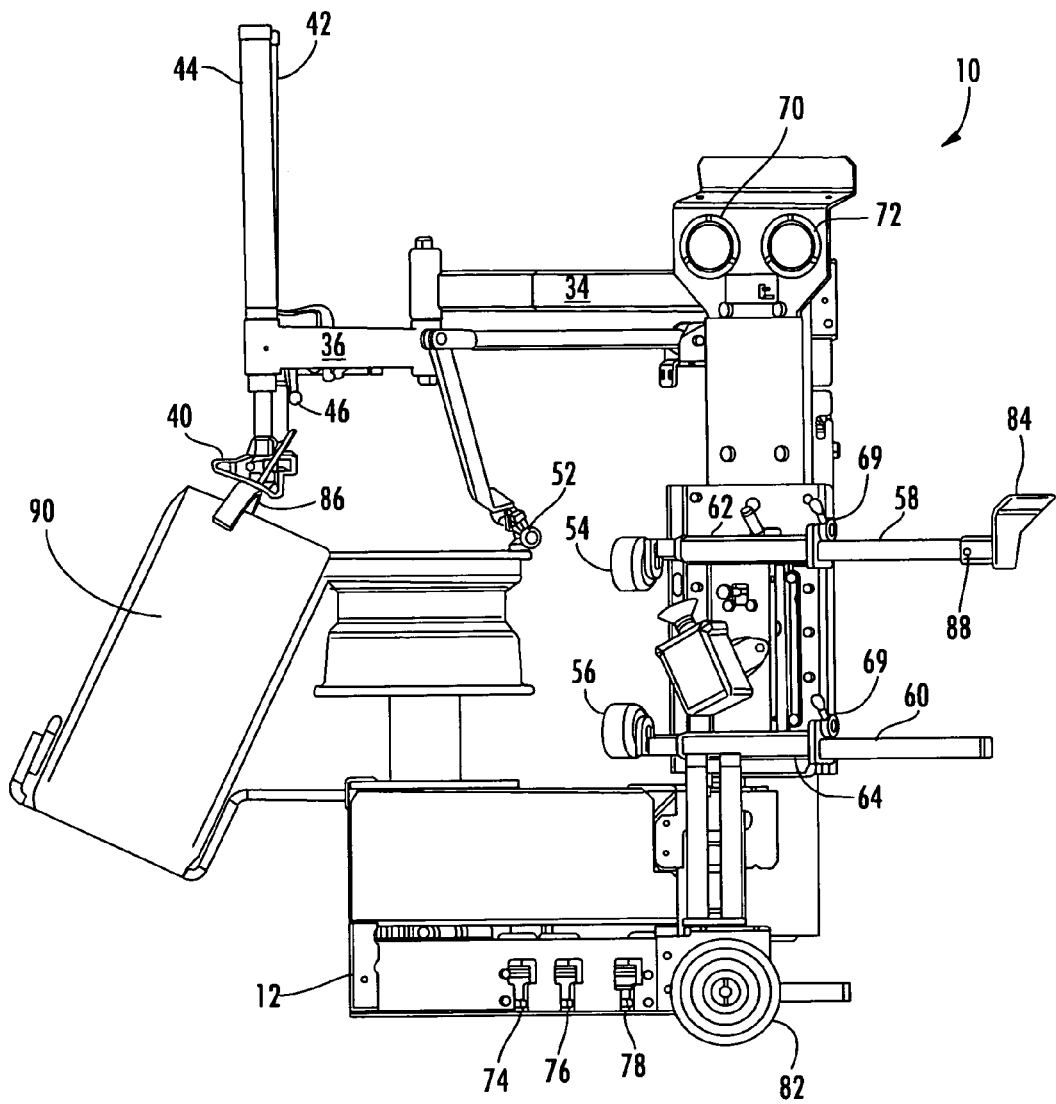
FIG. 7 is a side view of the tire changing machine in FIG. 1 with the tire and rim as in FIG. 6.
Figure 8:
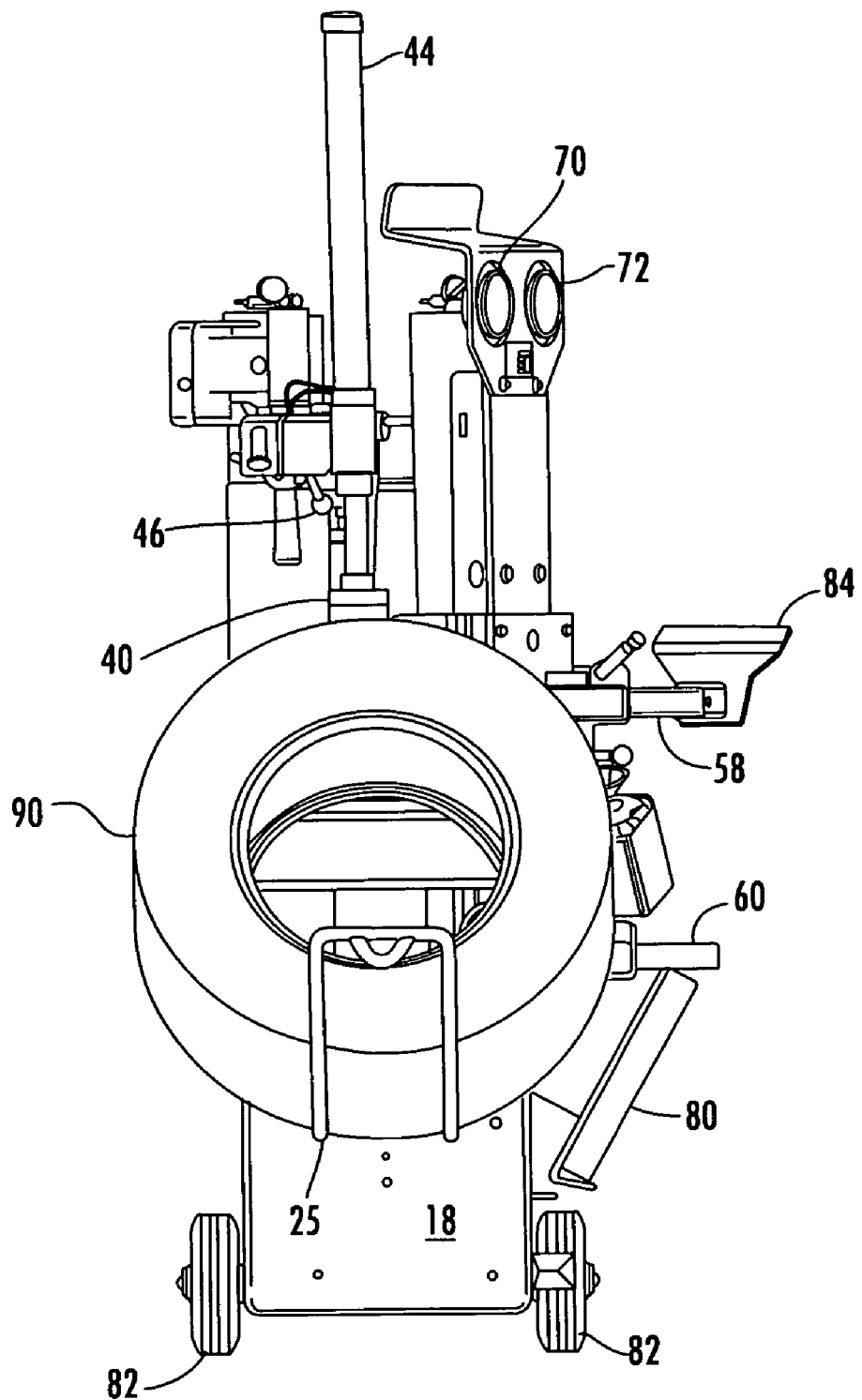
FIG. 8 is a front view of the tire changing machine shown in FIG. 1 with the tire and rim as in FIG. 6.
Figure 9:
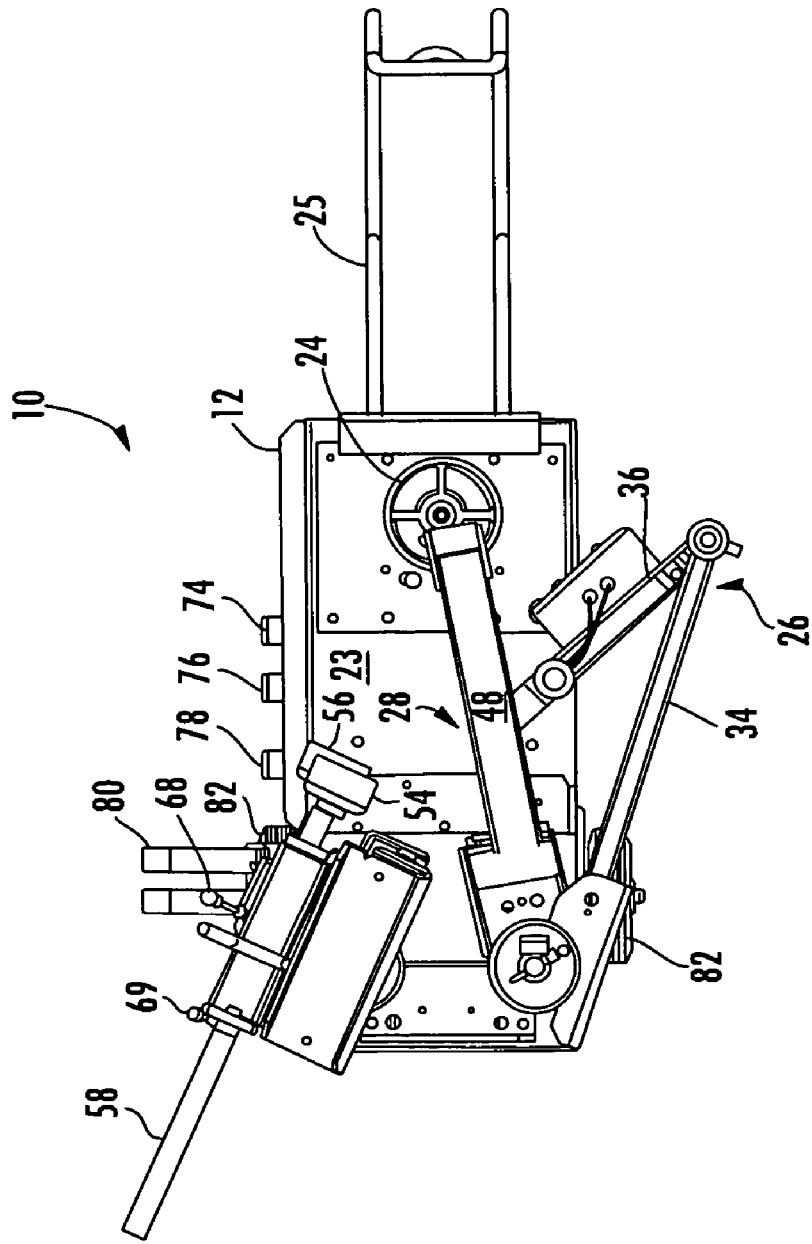
FIG. 9 is a top view of the tire changing machine shown in FIG. 1.

Referring now to FIG. 7, machine 10 may also include an articulated head 84 and a tire bar 86. Articulated head 84 fits on the opposite end of shaft 58 from roller 54 and secures to the shaft by way of a removable pin 88. In FIG. 7, head 84 is mounted in its storage position. When the operator wishes to use head 84, bar 58 is slid out of receiver 62 and then reinserted from the opposite end (i.e., with roller 54 toward back 20 of machine 10). Head 84 is then reattached to the end of bar 58 opposite roller 54. Articulated head 84 is shaped so as to assist the operator in removing a tire sidewall and tire bead when the tread portion of the tire has torn away from the remainder of the tire. Such a situation sometimes happens when a tire "blow out" occurs.

Figure 10:
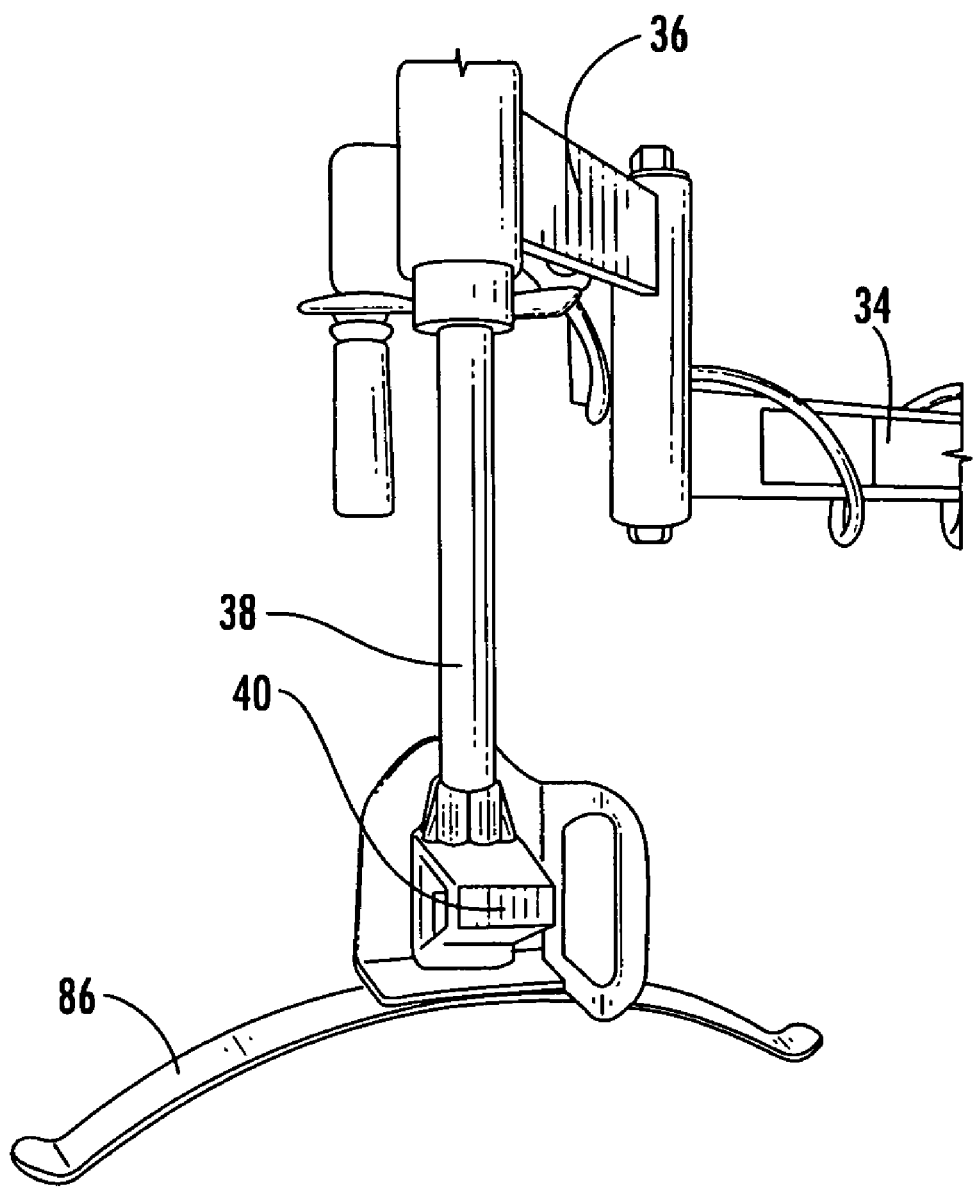
FIG. 10 shows the arcuate tire bar attached to the contact block of the helper arm assembly.

Tire bar 86 (also shown in FIG. 10) fits over contact block 40 and preferably has an arcuate shape configured to apply distributed pressure to the top of a tire 90 located in saddle 25. Using cylinder 44, bar 86 can be pressed against tire 90 to achieve ovalation. That is, the tire is pressed into a slightly oval shape. In this oval and secure shape, it is easier for the operator to remove or insert a tire liner.

The process of inserting or removing a tire liner 91 will now be described. To insert a tire liner, the operator places tire bar 86 on contact block 40 and lowers the bar onto the tire by operating lever 46, thereby pressing block 40 downward.

Figure 11:
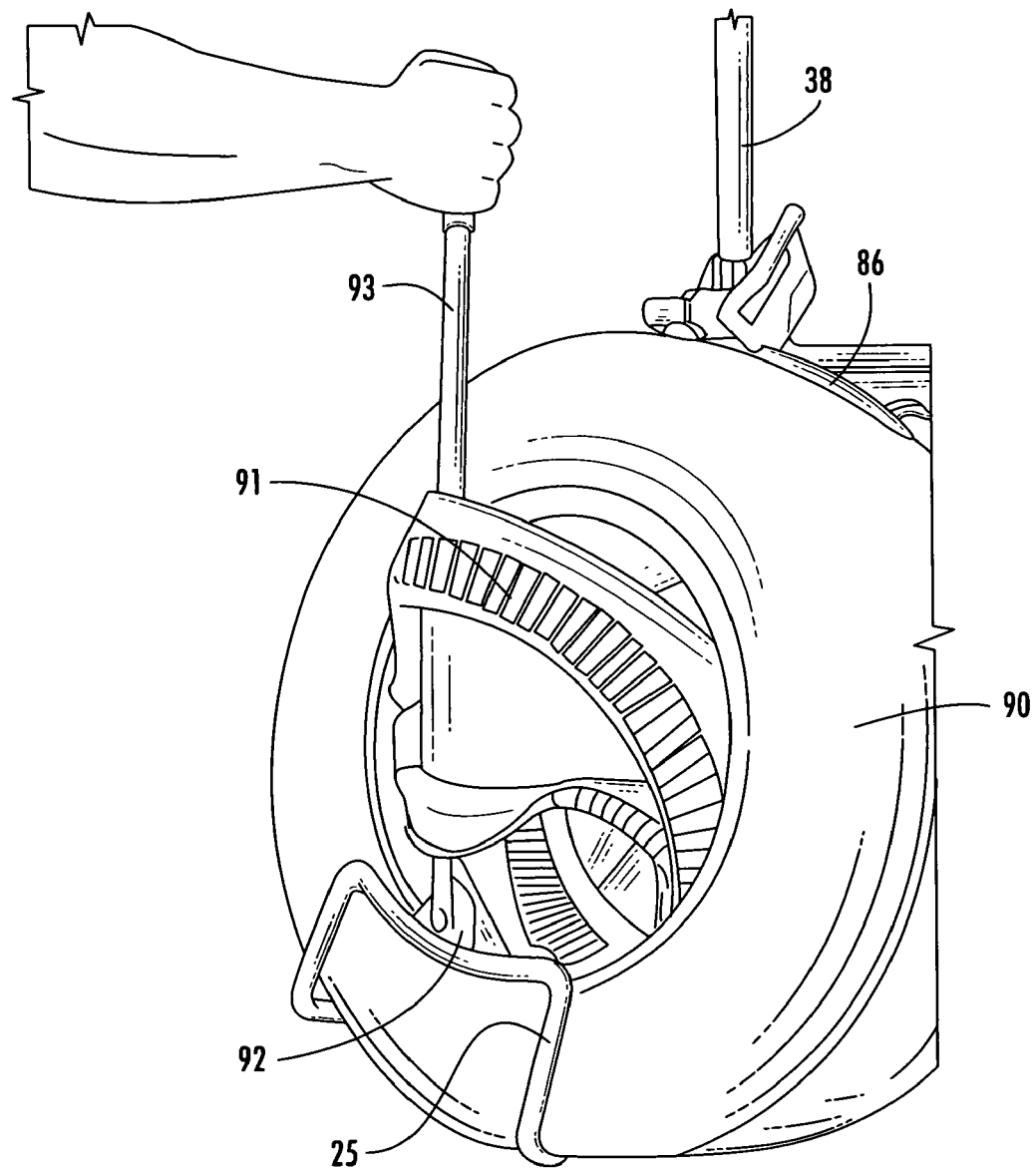
FIG. 11 illustrates one preferred method of removing the inner lining of a NASCAR-type tire in accordance with the present invention.

Once the tire is sufficiently ovalated, the operator can more easily manually press the tire liner into the tire's interior. To remove a tire liner, the operator once again ovalates the tire with bar 86 (as shown in FIG. 11). Then, the operator uses a special bar 93 having a handle at one end and a weld mark at a predetermined point to remove the liner. Bar 93 is inserted between the tire and the liner at the 12 o'clock position. Bar 93 is then inserted until the weld mark aligns with the tire's upper bead edge. After this, bar 93 is pulled down until its tip can be rested in a notch 92 in saddle 25. Using notch 92 as a fulcrum, the operator may now pull forward and remove the liner from the tire.

Figure 6:
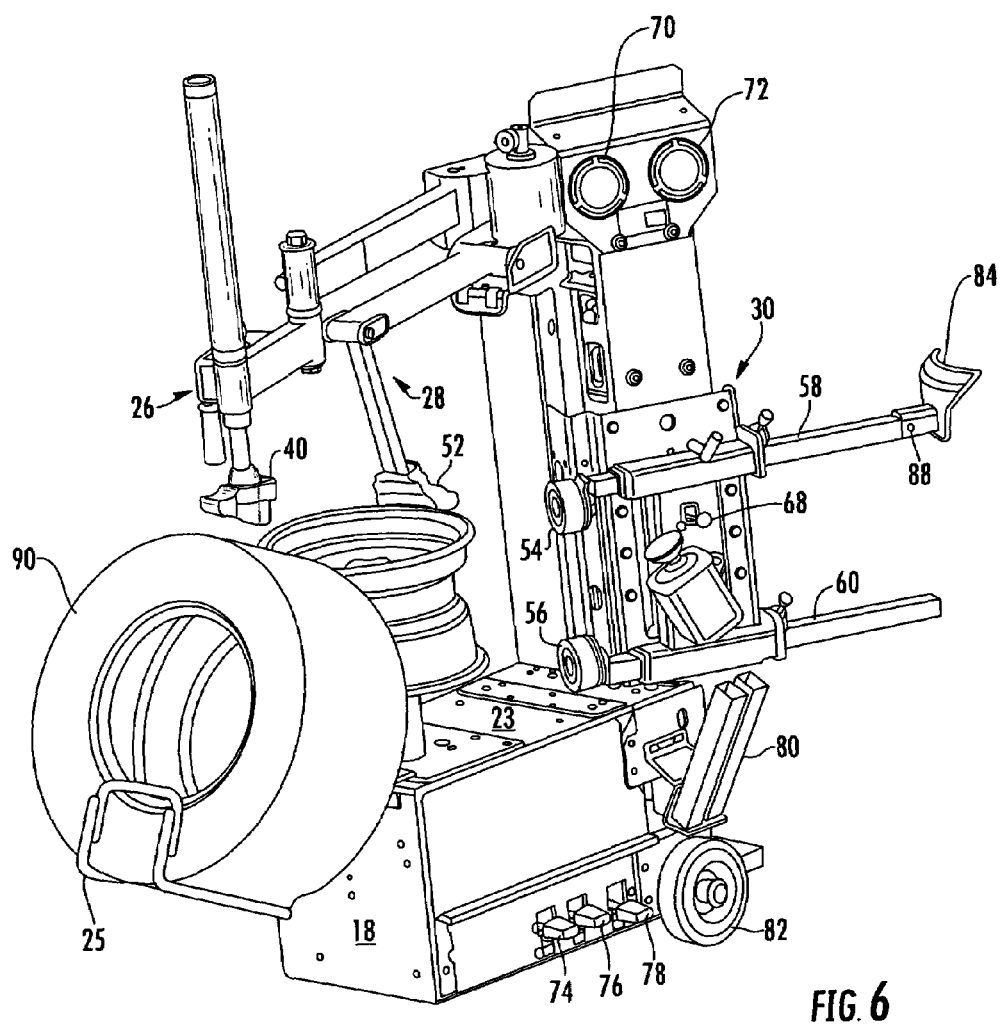
FIG. 6 is a perspective view of the tire changing machine of FIG. 1 with a NASCAR-type tire carried by the saddle and rim mounted on the turntable.

The process of mounting and demounting a NASCAR-type tire on machine 10 will now be described with reference to all of the Figures, but in particular reference to FIGS. 6 and 7. A tire 90 mounted on a rim is first mounted to chuck 22, and centering cone 24 is threaded onto the chuck and tightened so as to secure the rim to the chuck.

Figure 12:
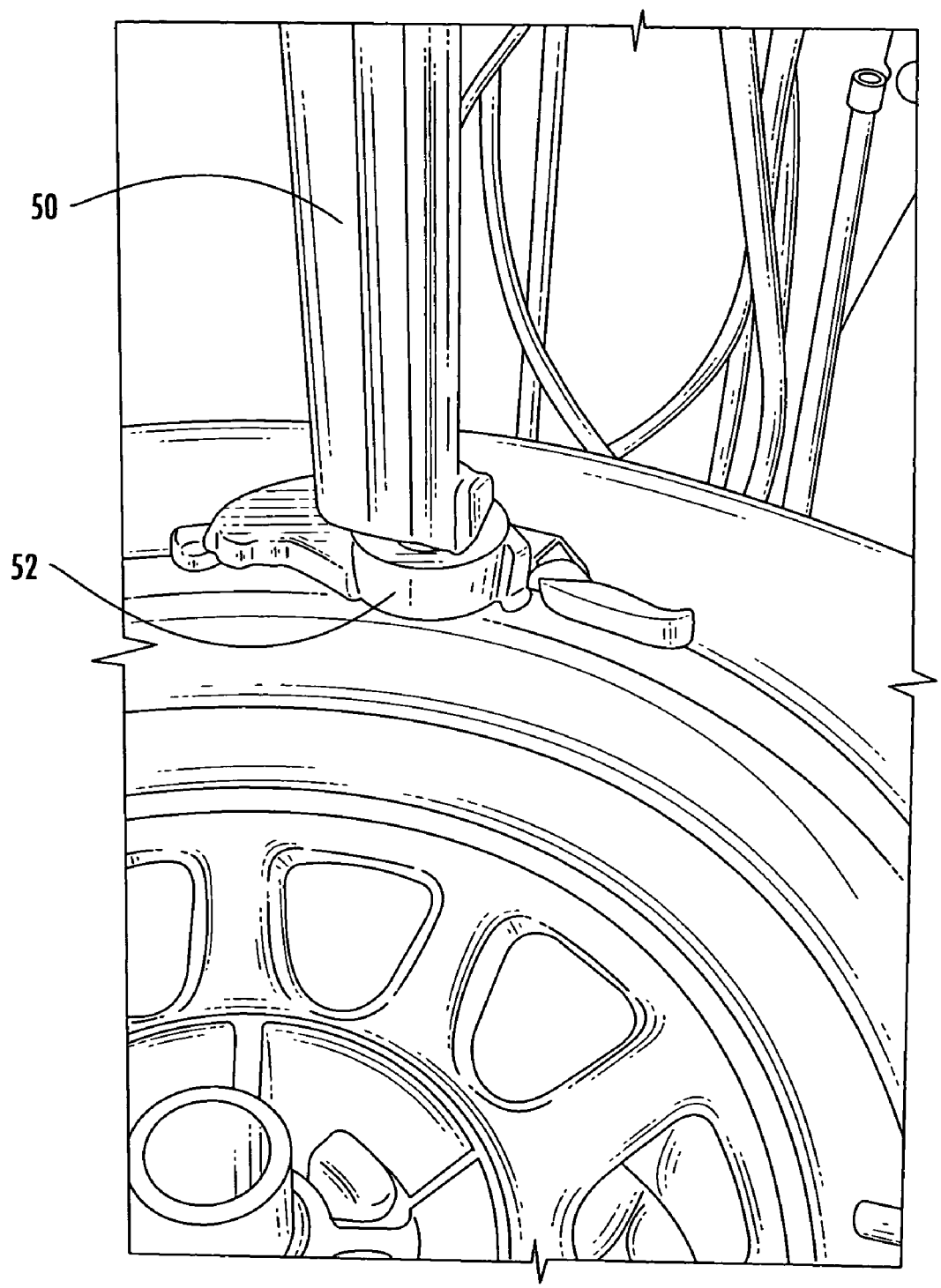
FIG. 12 shows the mount/demount head adjacent the rim's top edge.

With the tire-rim assembly mounted to chuck 22, the operator positions upper offset roller 54 at the edge of the tire-rim interface and locks this position into place with cam lock 69. While depressing pedal 78 to begin rotating the tire-rim assembly, the operator incrementally lowers roller 54 so as to push the tire's top bead into the rim's drop center. At this point, mount/dismount head 52 is placed on the rim's top edge (as shown in FIG. 12) by manipulating arm 50. Then, both the tire's bead and the liner's bead should be lubricated, which will minimize the frictional forces exerted between the liner, the tire, and the rim's edge.

Figure 13:
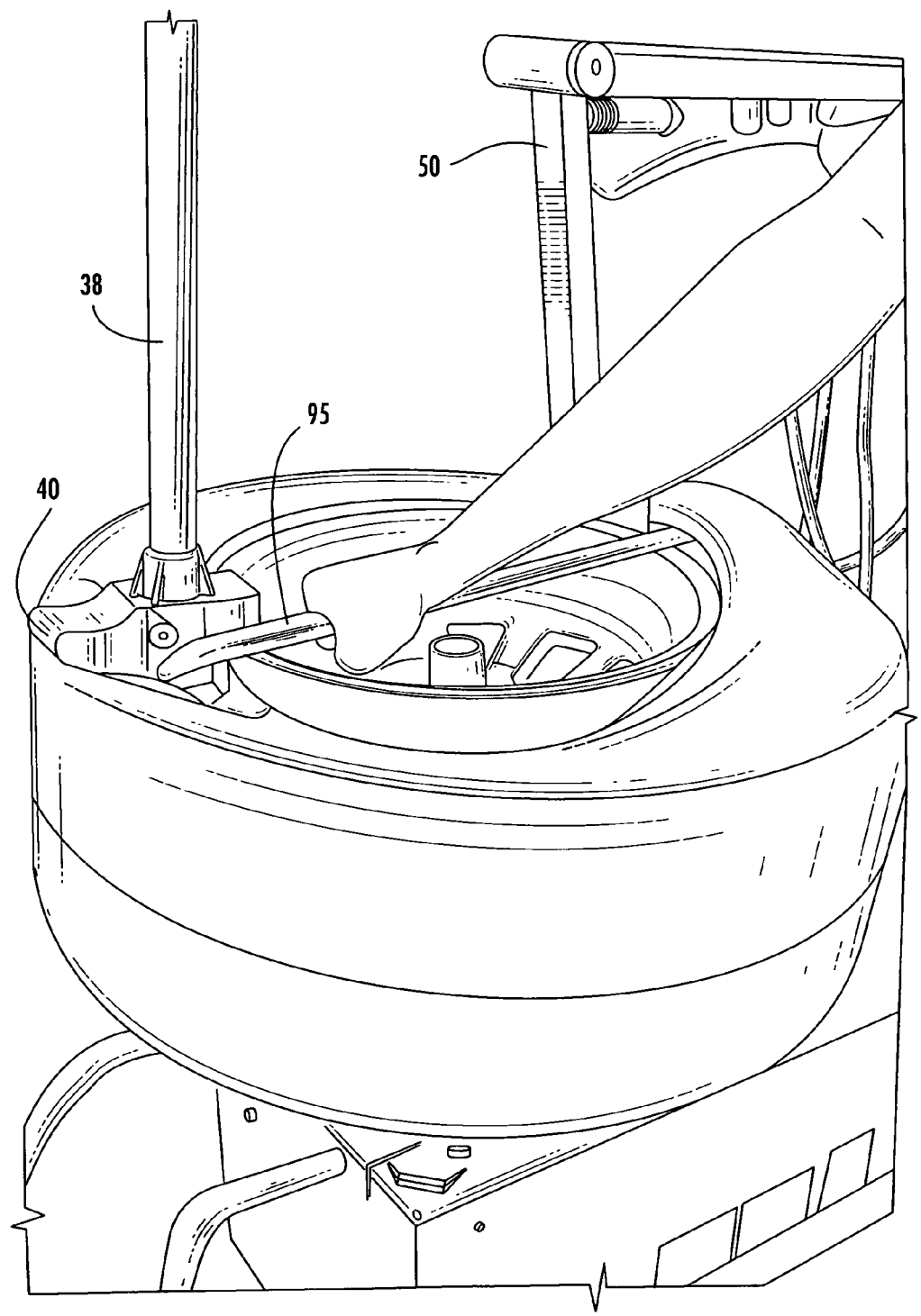
FIG. 13 shows the use of an elongate lift tool to pry the tire's top bead over the mount/demount head.

Next, the operator positions contact block 40 at a position approximately 180 degrees about the tire from mount/demount head 52. Contact block 40 is brought down to press the tire's sidewall even with the rim's drop center. At this point, the lift tool 95 is retrieved from tool holder 80 and used to pry the tire's top bead over the front edge of mount/dismount head 52 (see FIG. 13). Slow rotation of the tire will allow the mount/dismount head to begin removing the top bead. Contact block 40 should be moved up and away from the tire as the wheel rotates.

Once the top bead is completely above the rim's top edge, the lift tool is used to pry the liner's top bead over mount/dismount head 52. In some cases, it may be necessary to apply some force to the tire sidewall with roller 54 to expose the liner's top bead. Rotating the lift bar over the mount/dismount head lifts the liner's bead over head 52. Rotation of chuck 22 will enable head 52 to raise the liner's top bead above the rim's top edge.

At this point, removal of the lower bead may begin. This process begins by positioning lower offset roller 56 near the intersection of the lower bead and the rim. While rotating the chuck by depressing pedal 78, the operator slowly raises roller 56 until the lower bead is pushed into the rim's drop center. With head 52 still positioned near the rim's top edge, contact block 40 is positioned about 90 degrees clockwise from head 52 to hold the tire in the drop center position. That is, the front of contact block 40 pulls up on the tire's top bead (and the liner's top bead) to tilt the tire and keep that side of the lower bead in the drop center.

Next, the operator rotates the rim until contact block 40 is opposite head 52 (hinged arm segments 34 and 36 enable contact block 40 track the rim's rotation). Using the lift tool, the operator inserts the end of the tool under the liner's lower bead at head 52 and pries the lower liner bead onto head 52. Contact block 40 may now be moved out of the way. With the lower liner bead on head 52, the rim is rotated until the liner is removed from the rim. After removing the liner, the tire's lower bead can be removed similarly by prying the lower bead over head 52 and rotating the rim. The tire and tire liner are now completely removed from the rim.

Mounting a tire to a rim will now be described. First, the previously discussed process of inserting the tire liner into tire 90 should be performed. Next, the rim should be mounted to chuck 22 with centering cone 24. The beads of the tire and tire liner should be well lubricated to ease the process of mounting the tire. This lubrication process may be conveniently performed with the tire in saddle 25.

Next, the tire is moved from the saddle to atop the rim. Mount/dismount head 52 is then positioned at the rim's top edge and the tire's lower bead is positioned below head 52. While holding the tire at an angle and manually pressing from above, rotation of the rim by the operator will allow the lower tire bead to be forced below the rim's top edge.

Once the lower tire bead is over the top edge, reversal of the rotation direction by pulling up on pedal 78 allows the liner's lower bead to drop into mounting position on head 52. Then, pressing down on pedal 78 to rotate in the clockwise direction will force the liner's lower bead over the top edge. Next, the lift tool can be used as an aid to press the upper tire liner bead down over the leading part of head 52. Now, clockwise rotation of the rim will mount the top liner bead by having head 52 force it below the rim's top edge.

To mount the tire's top bead, upper offset roller 54 is brought into position on the tire's sidewall and pushes the sidewall even with the rim's drop center. Contact block 40 is then brought into position just ahead of roller 54, pressing the tire's sidewall into the drop center. Rotation of the rim at this point will allow head 52 to force the tire's top bead into the rim's drop center. Once the top bead is mounted, roller 54, contact block 40, and head 52 are moved out of the way.

With the tire mounted to the rim, the tire and tire liner can now be inflated. Machine 10 is fitted with two gas supply systems and separate inflation hoses 97 and 99 (FIG. 1) so that both cavities (between the tire and the liner and between the liner and the rim) may be inflated simultaneously. Pedals 74 and 76 control the gas flow from the gas supplies to the inflation hoses and into the tire and tire liner. Pressing down allows gas pressure to enter the tire and tire liner, while pulling up on the pedals will release pressure from the cavities. Twin inflation gauges 70 and 72 may be used to adjust the tire and tire liner to desired pressures.

At this point, the tire is mounted, inflated, and ready to be mounted on a vehicle.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Moreover, tire changing machines in accordance with the present invention may include some, most or all of the various implements and features described herein. It is further contemplated that various features described herein may be adapted to retrofit existing tire changing machines and are thus fully patentable in their own right. Therefore, it is contemplated that any and all such embodiments are included in the present invention as may fall within the scope and spirit thereof.

What is claimed:

1. A tire changing machine comprising:
a chassis;
a rotatable turntable configured a retain a wheel rim;

a tower carrying a mount/demount head movable toward and away from the wheel rim;

a saddle for retaining a tire in a generally upright configuration; and an ovalation mechanism operative to press on a tread portion of said tire mounted in said saddle so as to ovalate said tire.

2. A tire changing machine as set forth in claim 1, wherein said ovalation mechanism includes a helper arm assembly having an articulated helper arm.

3. A tire changing machine as set forth in claim 2, wherein said helper arm assembly further comprises a fluid actuated cylinder located at a distal end of said articulated helper arm.

4. A tire changing machine as set forth in claim 3, wherein said fluid actuated cylinder has a piston shaft carrying a contact block at a distal end thereof.

5. A tire changing machine as set forth in claim 4, wherein said ovalation mechanism further comprises an arcuate tire bar connected to said contact block.

6. A tire changing machine as set forth in claim 1, wherein said ovulation mechanism further comprises an arcuate tire bar.

7. A tire changing machine as set forth in claim 1, further comprising wheels located adjacent a back of said chassis to facilitate movement of said tire changing machine.

8. A tire changing machine as set forth in claim 2, wherein said saddle is attached to said chassis at a front thereof, said saddle being configured for use as a handle in lifting said front of said chassis.

9. A tire changing machine as set forth in claim 8, wherein said saddle is reversible between a tire holding and a handle position.

10. A tire changing machine as set forth in claim 1, wherein said saddle defines a notch for receipt of a tip portion of a pry bar, said notch providing a fulcrum for removal of a tire liner.

11. A tire changing machine as set forth in claim 1, further comprising dual gas supplies with separate inflation hoses.

12. A tire changing machine as set forth in claim 1, further comprising a horizontal roller assembly having at least one roller.

13. A tire changing machine as set forth in claim 12, wherein said horizontal roller assembly includes at least one roller mounted at the distal end of an elongate bar, said bar being slidable in a horizontal receiver.

14. A tire changing machine as set forth in claim 13, wherein said receiver is vertically movable.

15. A tire changing machine as set forth in claim 14, wherein a rotational axis of said roller is laterally offset from an axis of said elongate bar.

16. A tire changing machine as set forth in claim 15, wherein said at least one roller comprises first and second rollers mounted at the distal end of respective first and second elongate bars.

17. A tire changing machine as set forth in claim 1, further comprising a plurality of pedal actuators located on a first lateral side of said chassis.

18. A tire changing machine as set forth in claim 1, wherein said rotatable turntable comprises a chuck and centering cone arrangement.

19. A tire changing machine comprising:

a chassis;

a rotatable turntable configured a retain a wheel rim;

a tower carrying a mount/demount head movable toward and away from the wheel rim;

a horizontal roller assembly having at least one roller mounted at the distal end of an elongate bar, said bar being slidable in a horizontal receiver; and wherein said receiver is vertically movable.

20. A tire changing machine as set forth in claim 19, wherein a rotational axis of said roller is laterally offset from an axis of said elongate bar.

21. A tire changing machine as set forth in claim 19, wherein said at least one roller comprises first and second rollers mounted at the distal end of respective first and second elongate bars.

22. A tire changing machine as set forth in claim 21, wherein a rotational axis of each of said first and second rollers is laterally offset from an axis of said first and second elongate bars, respectively.

23. A tire changing machine comprising:

a chassis;

a rotatable turntable configured a retain a wheel rim;

a tower carrying a mount/demount head movable toward and away from the wheel rim; and first and second separate gas supplies with respective first and second inflation hoses permitting simultaneous inflation of a tire and an inner liner thereof.

24. A tire changing machine as set forth in claim 23, wherein said first and second separate gas supplies function to supply different gases.

25. A tire changing machine as set forth in claim 24, wherein one of said gases is air.

* * * * *